United States Patent [19]  [11] 4,062,022
Murakami et al.  [45] Dec. 6, 1977

[54] DEVICE FOR PREVENTING ERRONEOUS HANDLING OF A CAMERA

[75] Inventors: Hiroyashu Murakami, Tokyo; Tadashi Ito, Yokohama; Fumio Ito, Yokhama; Nobuaki Sakurada, Yokohama; Mashaharu Kawamura, Hino; Nobuhiko Shinoda, Tokyo, all of Japan

[73] Assignee: Canon Kabushiki Kaisha, Tokyo, Japan

[21] Appl. No.: 623,370

[22] Filed: Oct. 17, 1975

[30] Foreign Application Priority Data
  Oct. 18, 1974  Japan .................... 49-119939

[51] Int. Cl.² ............................................. G03B 7/08
[52] U.S. Cl. ............................ 354/38; 354/60 R; 354/266
[58] Field of Search ............... 354/26, 29, 30, 36, 354/37, 38, 43, 44, 50, 51, 60 R, 266

[56] References Cited
U.S. PATENT DOCUMENTS

| 3,899,789 | 8/1975 | Taguchi et al. ............... 354/30 |
| 3,950,765 | 4/1976 | Nanba et al. .................. 354/29 |
| 3,972,055 | 7/1976 | Matsuda et al. ............... 354/30 |

Primary Examiner—Russell E. Adams
Attorney, Agent, or Firm—Toren, McGeady and Stanger

[57] ABSTRACT

A device for preventing erroneous handling of a camera capable of dual type automatic exposure control including shutter time preference and diaphragm preference, wherein the device senses whether the camera is set at a diaphragm preference position or at a diaphragm automatic adjusting position with regard to the diaphragm setting means, and whether the shutter time preference position or the shutter time automatic adjusting position is selected for the shutter time setting means. The camera is rendered inoperative when both the diaphragm setting means and the shutter time setting means are set in their respective preference positions.

10 Claims, 5 Drawing Figures

DEVICE FOR PREVENTING ERRONEOUS HANDLING OF A CAMERA

BACKGROUND OF THE INVENTION

1. Field of the Invention

The present invention relates to a device to prevent erroneous handling of a camera having an automatic exposure determination device as can be applied to either an automatic diaphragm system with shutter time preference (EE) or an automatic shutter speed determination system with diaphragm preference (auto).

2. Description of the Prior Art

Systems to automatically control exposure of a camera, include shutter time preference means to set shutter time beforehand for automatically controlling the diaphragm, and diaphragm preference means to set the diaphragm aperture beforehand for automatically controlling shutter time. However, while proper shutter time can be selected for a moving object by the shutter time preference, depth of photographing field can not be set freely. On the other hand, while proper the depth for photographing an object can be selected for a stationary object by setting of the appropriate diaphragm aperture as desired, shutter time can not be set freely in the diaphragm preference. Since both shutter time preference and diaphragm preference have respective advantages and disadvantages, a dual preference camera having both the functions of the shutter preference and the diaphragm preference both has been proposed. Such a dual preference camera may have a dial etc., to set shutter time, a change over member to switch the shutter time to be automatically controlled, a ring, etc. to set the diaphragm, and a change over member to so change over the diaphragm to automatic control. In shutter time preference photography, when any desired shutter time is set and the diaphragm is so controlled as to be automatically controlled, when shutter release is effected exposure can be accomplished such that the diaphragm aperture is automatically controlled based on the brightness of an object. Also in diaphragm preference photography, when any desired diaphragm aperture is set and shutter time is so changed as to enable automatic control then shutter release is effected, such exposure can be accomplished such that shutter time is automatically controlled based on the brightness of an object. But the camera has the shortcoming that when shutter release is effected by so changing shutter time as to make it automatically controlled and at the same time so changing over the diaphragm as to make it automatically controlled also, determination of such shutter time and diaphragm aperture as will provide proper exposure can not be accomplished, resulting in failure in photographing.

SUMMARY OF THE INVENTION

An object of the present invention is to provide an erroneous handling preventive device for a dual preference camera, in which release the signal for the shutter is not transmitted to the shutter when the shutter time is so changed over as to be automatically controlled and at the same time the diaphragm is so changed over as to be automatically controlled also.

DESCRIPTION OF PREFERRED EMBODIMENTS

Figure 1A:
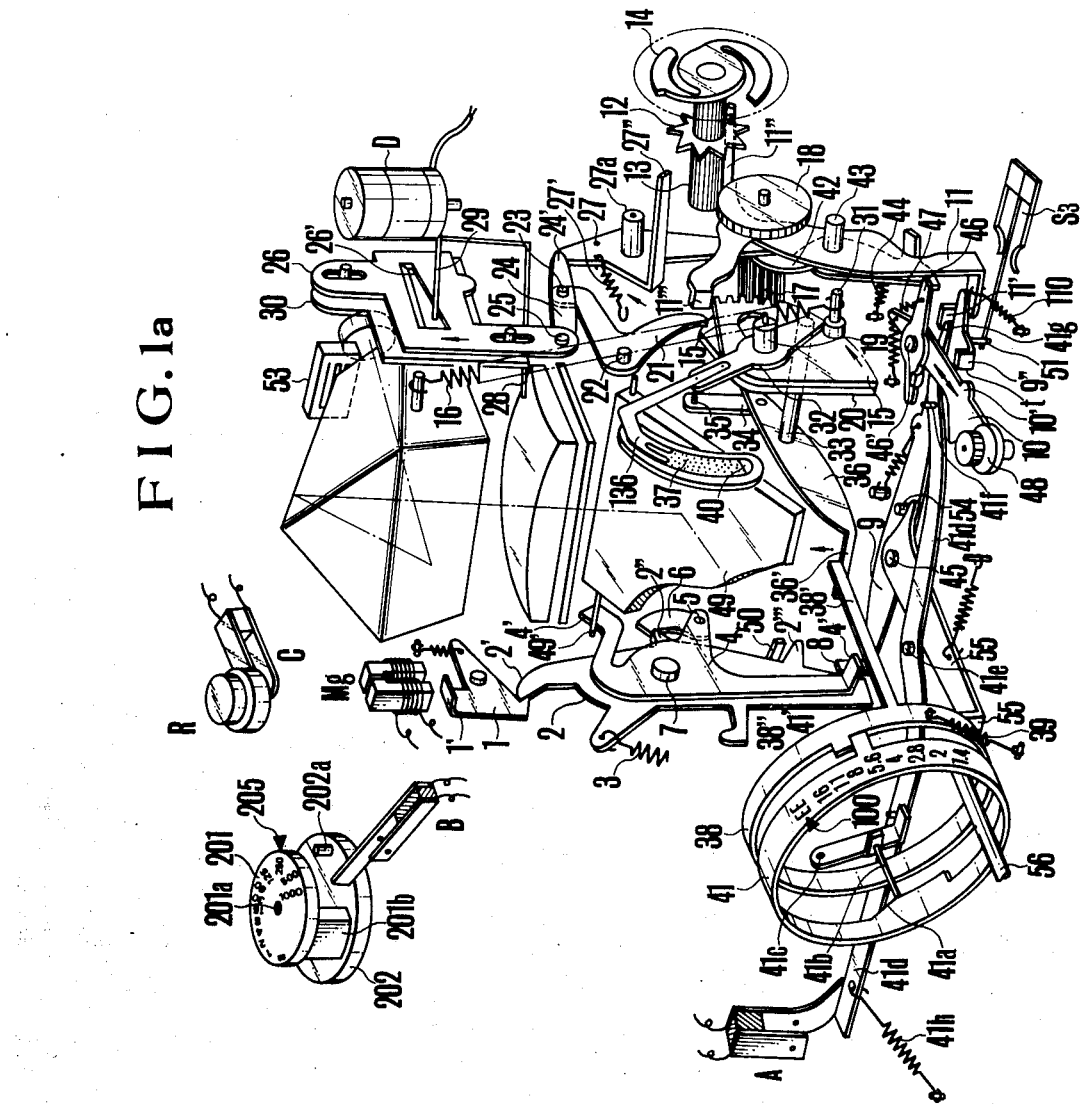
FIG. 1(a) is an oblique view to show an internal mechanism of a single lens reflex camera having an example of an erroneous handling preventive device according to the present invention.
Figure 1B:
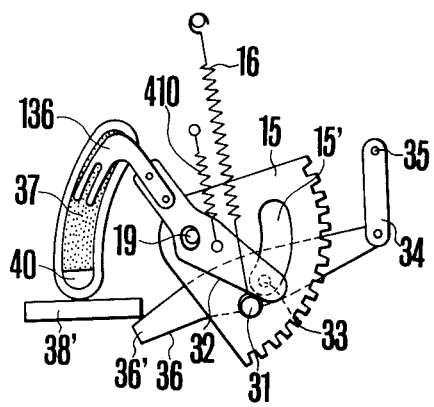
FIG. 1(b) is an enlarged plan for a part of the mechanism shown in FIG. 1(a).

FIG. 1(a) is an oblique view to show an internal mechanism of the single lens reflex camera having a device of the present invention, showing a state in which diaphragm setting EE with shutter time preference is set and shutter charge is completed. FIG. 1(b) is an enlarged plan of a part of FIG. 1(a). In FIG. 1(a), 201 is a shutter time setting dial being axially supported in a rotatable manner at a base plate 202 fixedly provided at a camera body, and having at its upper plane a shutter time scale and an "auto" mark to show an automatic position to which shutter time is changed over for automatic control, wherein when the auto mark of said shutter time setting dial is matched with a mark 205, a switch B is made to go OFF through a member 201b, while when shutter time scale other than the auto mark is matched with the mark 205, said switch B goes ON. 202a is a pin to control the rotation of the shutter time setting dial 201, mounted on the base plate 202, and when the shutter time setting dial 201 is rotated in the clockwise direction it stops the rotation of the shutter time setting dial up to the position "B", while when the shutter time setting dial is rotated in a counter-clockwise direction it is locked at a locking mechanism (not shown). 201a is a button of a locking release mechanism (not shown in the drawing) for said locking mechanism.

41 is a diaphragm ring which can be rotated around an optical axis and has at its external circumference a diaphragm aperture scale and an EE mark to show an automatic position to which the diaphragm is changed over for automatic control, and is engaged with a diaphragm preset ring 38 by a projection 41'. A cam 41a is provided at the diaphragm ring 41, and when the EE mark is matched with a mark 100, a lever 41d is rotated in a clockwise direction around an axle 41e against a spring 41h through a pin 41b and a lever 41c to place a switch A in the OFF state. When a diaphragm scale other than the EE mark is matched with the mark 100, the switch A goes ON.

When photographing is done with shutter preference, a desired shutter speed scale graduation on the shutter time setting dial 201 is matched with the mark 205 to make the switch B go ON, and the EE mark on the diaphragm ring 41 is matched with the mark 100 to make the switch A go OFF. When photographing is done with diaphragm preference, a desired diaphragm scale graduation on the diaphragm ring 41 is matched with the mark 100 to make the switch A go ON, and the auto mark on the shutter time setting dial 201 is matched with the mark 205 to make the switch B go OFF. In a case of manual photographing, a desired shutter speed scale graduation on the shutter time setting dial 201 is matched with the mark 205 to make the switch B go ON, and a desired diaphragm scale graduation on the diaphragm ring 41 is matched with the mark 100 to make the switch A go ON. If the auto mark of the shutter time setting dial is matched with the mark 205 and at the same time, the EE mark of the diaphragm ring 41 is matched with the mark 100, both switch A and switch B go OFF.

Figure 2:
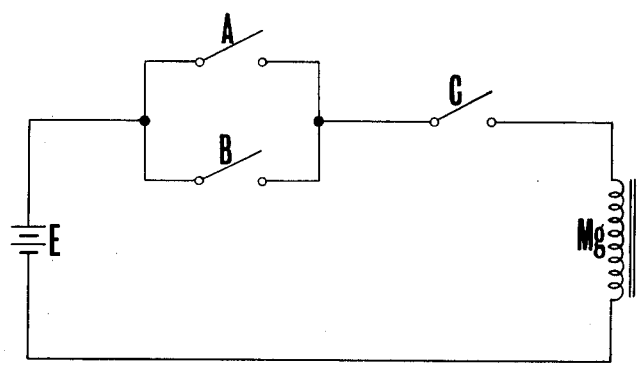
FIG. 2 is an electro-magnetic release circuit diagram in the example shown in FIG. 1(a).

FIG. 2 shows an electro-magnetic release circuit, in which a switch C linked with the switches A and B and a shutter release button R, and a power source E, as well as a magnet Mg to release the checking engagement between the release lever 1 and a main lever 2, are connected as shown in the diagram. As explained above in the cases of shutter preference photographing, diaphragm preference photographing and manual photographing, since one or both of the switch A and/or the switch B are made to go ON, as the switch C is closed in an association with the release button R, current flows to the circuit shown in FIG. 2 to magnetize the magnet Mg to conduct exposure control and exposure of the device shown in FIG. 1(a) is effected. But, when both the shutter time setting dial 201 and the diaphragm ring 41 are set at the automatic position simultaneously as mentioned above, both the switch A and the switch B go OFF, therefore even if the switch C is closed in association with the release button R, the magnet Mg is not magnetized and the exposure of the device shown in FIG. 1(a) is not effected, and thus erroneous handling can be prevented.

Next, there will be explained the function of the system shown in FIG. 1(a), (b) and FIG. 2 in a case of shutter preference.

Now, when the shutter release button R is pressed down, as mentioned above a contact B in the circuit of FIG. 2 goes ON and the switch C is closed to magnetize the magnet Mg, while one end 1' of the release lever 1 is attracted to release its engagement with a claw 2' of the main lever 2. The main lever 2 is pulled by a spring 3 to rotate in a counter clockwise direction, and at a same time a mirror push up lever 4 which axially supports a claw 6 engaging with one end 2" of the main lever with an axle 5 is rotated in a counter clockwise direction. At this time, a linking lever 9 is pushed by a lever 4 and rotates as much as a gap to between itself and a sector gear 10, and a tightening lever 11 is also rotated in a similar direction by a spring 110 following the rotation of the lever 9, releasing a stop wheel 12 of a speed regulating mechanism by one end 11" of the lever 11, while releasing a sector gear 15 with its other end 11'''.

Then the sector gear 15 is pulled by a spring 16 and is rotated in a counter clockwise direction at a constant speed by a speed regulating mechanism consisting of a pinion 17, a gear 18, a pinion 13, and a speed regulating member 14, and at the same time a cam 20 installed at an axle 19 of the sector gear 15 is also rotated. By this a cam follower lever 21 axially supported at an axle 22 is pushed by the cam 20 and rotates in a counter clockwise direction, while an equalizer 24 installed at the lever 21 with an axle 23 is rotated using one end 24' engaging with a stop lever 27 as its fulcrum, to push up a meter cam 26 upward by an axle 25 at the other end thereof.

On the other end, a meter D shows appropriate diaphragm aperture value within a finder by a pointer 28 by a conventionally known first exposure operation circuit 57 (refer to FIG. 4), which employs as its operation elements an object brightness being irradiated on a light receiving element 53 within a finder optical path by passing through a taking lens in a fully opened diaphragm aperture state, a film sensitivity and such shutter speed as desired by a photographer, while the meter cam 26 stops holding the other pointer 29 between itself and a pointer holding plate 30.

When the sector gear 15 further continues rotation after clamping of the pointer 29, the equalizer 24 receives the reaction of the pointer clamping and rotates using the one end 25 as fulcrum to release the engagement between the other end 24' and the stop lever 27. By this, the stopper lever is pulled by the spring 27' and rotates in a counter clockwise direction, while the claw 27" of the stop lever 27 engages with a stop wheel 12 to stop its rotation, locking the sector gear 15 being linked therewith.

By the rotation of the sector gear 15, an arm 32 installed to the axle of said gear 15 rotates integrally, and a brush 136 provided at its one end slides on a variable resistance body 37 for exposure time control. On the other hand, since a signal lever 36 installed at the arm 32 through an axle 33 has its one end supported by a supporting arm 34 and one end of said arm 34 is axially supported at a camera main body, it is so rotated by being shifted upward using the axle 35 as fulcrum, and a pin 38' of a diaphragm preset ring 38 of an exchange lens is pushed with the other end thereof against the spring 39, and is rotated to a preset diaphragm value corresponding to an indicated value of the meter pointer 29. In other words, the meter cam 26, the cam 20 and other rings are so made that they can be changed over to the preset diaphragm value of lens corresponding to a diaphragm position of the meter pointer 29 corresponding to a given film sensitivity and a selected shutter speed. By this, a resistance value corresponding to the amount of shifting of the diaphragm preset ring 38 can be taken out of the brush 136 and a resistance terminal 40.

And as a stopper lever 27 departs from a returning lever 42, the lever 42 rotates in a clockwise direction by a spring 44, and one end of the lever 42 pushes a lever 46 axially supported by the sector gear 10, rotating the sector gear 10 around an axle 46' in a clockwise direction through a spring 47, and releasing the engagement of one end 9" of a linking lever 9 being checked by a projection 10' of the sector gear 10 through a delay governor 48.

When the checking of the linking lever 9 is released the main lever 2 being pulled by the spring 3 rotates the linking lever 9 in a clockwise direction through the mirror push up lever 4 around the axle 45, and a pin 54 provided on the linking lever 9 rotates a diaphragm lever 55, then a diaphragm linking pin 56 of an exchange lens is pushed by the end part 55' of the lever 55 to stop down a diaphragm not being shown in the drawing to a diaphragm aperture set by the diaphragm preset ring 38.

At this time, the mirror 49 ascends by the rotation of the mirror push-up lever 4 evacating itself from a finder optical path, and at the same time, a shutter lock lever 50 is pushed by one end 2" of the main lever 2 supporting the lever 4. By this a focal plane shutter not being shown in the drawing is released and as a leading screen and a follower screen complete running, the locking of the claw 6 is released by a mechanism omitted from the drawing and the automatic diaphragm of an exchange lens and the mirror 49 resumes the state of FIG. 1(a).

Since the light receiving element 53 is of a TTL system placed within a finder optical path in a series of function mentioned above, the mirror 49 ascends as mentioned above the lock release of the release lever 1, blocking the light sensing of an object. Therefore, as the light beam for the light receiving element 53 is blocked during the actuation of an electronic shutter to be described below, a memory means to memorize the amount of light of an object beforehand is necessary at a second exposure operation circuit.

This example is so made that after a resistance value 37 corresponding to a preset diaphragm is determined the memorizing of the amount of object light beam is completed. Therefore, after the resistance value 37 for exposure control is determined the tightening of the linking lever 9 is released, and as a pin 51 provided at end part of the linking lever 9 opens a switch $S_3$ to complete memorizing and the linking lever 9 further moves, the diaphragm is stopped down to the preset value through the pin 54, the diaphragm lever 55 and the diaphragm linking lever 56.

And, after shutter release, the shutter follower screen is closed according to a shutter speed corresponding to the resistance value 37 corresponding to the preset diaphragm value. Therefore, even when the diaphragm preset ring 38 does not give an appropriate preset value by a series of mechanical linking error, etc. such as a meter pointer error against the set shutter speed and the stopping position error of the stop wheel 12, as the memory type electronic shutter time is set through a resistance value 37 corresponding to the rotating position of the diaphragm preset ring 38, as long as a manufacturing error in the diaphragm value of the diaphragm preset ring 38 and the actual aperture of iris blades at an exchange lens side is small, exposure time will be almost equal to the set value, and appropriate exposure volume can be obtained at the film surface.

In the case of diaphragm preference, when the diaphragm ring 41 is rotated to a desired diaphragm scale graduation position, the projection 41' engages with the pin 38" of the diaphragm preset ring 38 to rotate the ring against the spring 39, and the linking pin 38' on the ring 38 is shifted upward while the signal lever 36 follows therewith being pulled by a spring 410. As the axle 33 connecting the lever 36 and the arm 32 is shifted within a long hole 15' (FIG. 1(b)) provided at the sector gear 15 to rotate the arm 32 in a counter clockwise direction, the brush 136 slides on the resistance body 37 to set a resistance value corresponding to the present value.

On the other hand, when the diaphragm ring 41 is rotated to a desired diaphragm scale graduation match with the mark 100, as the pin 41b contacts with low part of the cam 41a and the lever 41d is pulled by the spring 41h and rotates in a counter clockwise direction, the pin 41f at a forward end thereof rotates the sector gear 10 in a clockwise direction through the lever 46, and the spring 47, and the forward end 41g completely restricts the movement of the tightening lever 11. Therefore, the operation of the sector gear 15 will not be effected by release of the release lever 1 being linked wth the operation of the release button R, but as the projection 10' of the sector gear 10 escapes from the passage of one end 9" of the linking lever 9, the automatic stop down and mirror up etc. are ordinarily accomplished. And appropriate exposure time and appropriate exposure volume are determined by the same function as that of the above mentioned shutter time preference by the variable resistance value for exposure time control being set in correspondence with the rotation of the diaphragm preset ring 38.

Figure 4:
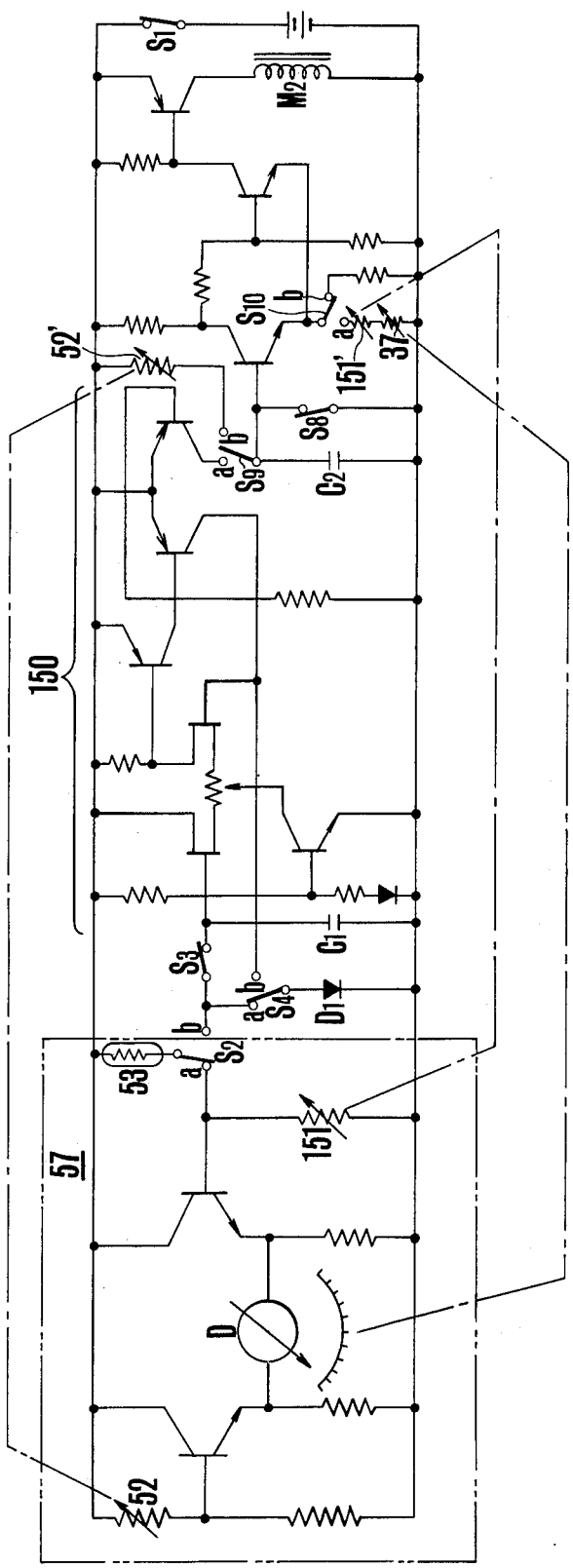
FIG. 4 shows a control circuit of the exposure mechanism shown in FIG. 1(a).

FIG. 4 shows a control circuit of an exposure mechanism shown in FIG. 1(a). In FIG. 4, E is a power source, $S_1$ is a power source switch, 52 is a shutter time setting resistance as mentioned above, 53 is a light receiving element positioned within a finder optical path, D is a meter, 57 enclosed by one point chain line is a diaphragm determining circuit at the time of shutter preference, 150 is a memory regeneration circuit, 151 is a film speed setting variable resistance, $C_1$ is a capacitor for memorizing object light volume, $C_2$ is a time constant capacitor, $D_1$ is a compression diode, $S_2$ is a change over switch for light measuring and memory, $S_3$ is a memory switch, $S_4$ is a change over switch for compression and regeneration, $S_9$, $S_{10}$ are manual change over switches, and $M_2$ is a magnet for holding a shutter follower screen.

In the case of shutter preference, the value of the resistance 52 will be determined by setting the shutter dial 201 as mentioned above, and as the power source switch $S_1$ is closed in association with the shutter release button, the swing angle of the meter D is determined by the resistance 151 set by the film speed and the resistance value of the light receiving element, while the resistance value of the variable resistance 37 is determined by the above mentioned rotation of the arm 32 along with the determination of the diaphragm aperture value. By further continued pressing down of the shutter release button the switch $S_2$ is changed over from "a" side to "b" side and the memory switch $S_3$ goes OFF while the voltage being compressed by the diode $D_1$ is memorized at the memory capacitor $C_1$ with the power source passing through the light receiving element 53. When the switch $S_3$ goes OFF in association with the run of the leading screen such current as is controlled by the memory regeneration circuit starts flowing to the time constant capacitor $C_2$, and after an elapse of a length of time determined by the resistance 151' corresponding to film sensitivity and the resistance 37 corresponding to the diaphragm aperture value, the magnet $M_2$ is actuated to release the hold of the follower screen and correct exposure corresponding to the set shutter time is effected.

Also at the time of diaphragm preference the resistance value corresponding to a desired diaphragm aperture value is set at the variable resistance 37 in association with the rotation of the diaphragm ring as mentioned above and proper exposure can be obtained in the same manner as in the case of shutter preference.

Next in the case of manual set the change over switches $S_9$, $S_{10}$ are changed over from "a" side to "b" side respectively by a method (not shown in the drawing), and both shutter and diaphragm work as per set value to conduct manual exposure.

Figure 3:
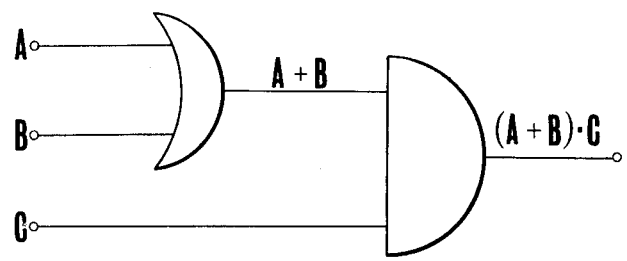
FIG. 3 is a diagram to show another example of the present invention.

Next, an example in which exposure control with the above mentioned erroneous handling prevention is digitally made will be shown in FIG. 3.

In this drawing, the input A will be "0" only when the diaphragm setting dial is set at an automatic position (EE), while it will be "1" in all other cases, and the input B will be "0" only when the shutter time setting dial is set at automatic position (auto) and will be "1" in all other cases, while the input C will be "1" only when the release button is pressed down and will be "0" in all other cases.

When the output A + B as in the input A, B are applied as input into the OR circuit and the input C is applied as input into the AND circuit, the output (A + B)·C can be obtained, wherein exposure and exposure control are effected only when the output (A + B)·C is "1", while exposure is not effected when it is "0". The functional chart of the input A, B, C and the output (A + B)·C is shown below:

| Number | Input & Output | A | B | C | (A+B)·C |
|---|---|---|---|---|---|
| | $n_1$ | 0 | 0 | 0 | 0 |
| | $n_2$ | 0 | 1 | 0 | 0 |
| | $n_3$ | 1 | 0 | 0 | 0 |
| | $n_4$ | 1 | 1 | 0 | 0 |
| | $n_5$ | 0 | 0 | 1 | 0 |
| | $n_6$ | 0 | 1 | 1 | 1 |
| | $n_7$ | 1 | 0 | 1 | 1 |
| | $n_8$ | 1 | 1 | 1 | 1 |

It is understood from the above chart that when the release button is not pressed down ($n_1$ to $n_4$) exposure will not be effected, and when the release button is pressed down at the time of shutter preference photographing, diaphragm preference photographing and manual photographing ($n_6$, $n_7$, $n_8$) exposure and exposure control will be effected, but when the release button is pressed down as the diaphragm setting dial and the shutter time setting dial are simultaneously set at an automatic position, exposure will not be effected and erroneous handling can be prevented.

As indicated in the foregoing, the present invention permits a camera to be easily set at a state desired by a photographer and at the same time a device is provided which can prevent erroneous handling of the camera such as setting both the shutter time setting dial and the diaphragm setting dial simultaneously at an automatic position in a dual preference camera, this being accomplished by means of a relatively simple structure.

While specific embodiments of the invention have been shown and described in detail to illustrate the application of the inventive principles, it will be understood that the invention may be embodied otherwise without departing from such principles.

What is claimed is:

1. A dual preference camera capable of effecting shutter time priority and aperture value priority comprising:
   a. shutter means;
   b. shutter control means functionally engaged with said shutter means;
   c. shutter time setting input means functionally engageable with said shutter control means for controlling said shutter means during an opening time of said shutter means corresponding to a set value, said shutter time setting input means having a first operating mode for manual adjustment of the shutter time and a second operating mode for automatic adjustment of the shutter time;
   d. aperture means;
   e. aperture control means functionally engageable with said aperture means;
   f. aperture value setting input means, functionally engageable with said aperture control means for controlling said aperture means in correspondence with an aperture set value, said aperture value setting input means having a first operating mode for manual adjustment of the aperture value and a second operating mode for automatic adjustment of the aperture value;
   g. exposure control means to effect a desired exposure time including light measuring means for measuring object brightness, said exposure control means being operatively connected to said shutter control means and said aperture control means to control said shutter means and said aperture means in accordance with signals from said shutter time setting input means, said aperture value setting input means and said light measuring means; and
   h. means for preventing erroneous handling of said camera, said erroneous handling preventing means being connected to said shutter time setting input means and said aperture value setting input means so that only when both said means are set in the automatic adjustment modes, the actuation of the shutter release of the camera is prevented.

2. A camera according to claim 1, wherein said exposure control means include memory means for storing information indicative of the amount of light available for an object to be photographed.

3. A camera according to claim 1, wherein said shutter time setting input means is structured to include a dial and has setting means for automatic mode operation and manual mode operation.

4. A camera according to claim 1, wherein said aperture value setting input means is structured to include an aperture value setting ring, and has setting means for automatic mode operation and manual mode operation.

5. A camera according to claim 1, wherein said erroneous handling preventive means has switching means comprising output terminals for the automatic adjustment modes of said shutter time setting input means and said aperture value setting input means.

6. A camera according to claim 5, including a shutter release which operates to generate an output signal said switching means being connected in series to receive said output signal of said shutter release.

7. A camera according to claim 6, wherein said switching means and said output signal of said shutter release constitute a logic circuit.

8. In an erroneous handling preventive device for a camera including:
   a. shutter means;
   b. shutter control means functionally engaged with said shutter means and including shutter release means;
   c. shutter time setting input means having a first operating mode for manual adjustment of the shutter time and a second operating mode for automatic adjustment of the shutter time;
   d. aperture means;
   e. aperture control means functionally engaged with said aperture means;
   f. aperture value setting input means having a first operating mode for manual adjustment of the aperture value and a second operating mode for automatic adjustment of the aperture value;
   g. a light measuring circuit for measuring light received from an object to be photographed; and
   h. proper exposure control means connected to said shutter time setting input means, and said aperture value setting input means; a light measuring circuit to control proper exposure amount comprising;
   A. a first signal generating means connected to said shutter time setting input means, and producing an output when the shutter time setting input means is in the automatic adjustment mode;
   B. a second signal generating means connected to the aperture value setting input means and producing an output when the aperture value setting input means is in the automatic adjustment mode; and C. an electromagnet release circuit connected to the first signal generating means and second signal generating means and the output signal of shutter release so that when both generating means produce outputs in the automatic adjustment mode, said shutter release means is rendered inoperative.

9. A device according to claim 8, wherein said first signal generating means and said second signal generating means form a switching means.

10. A device according to claim 8, wherein the first signal generating means, second signal generating means and shutter release output signal form a logic circuit.

* * * * *